Patented Apr. 1, 1941

2,236,768

UNITED STATES PATENT OFFICE 2,236,768

ZEIN ACETATE

Collins Veatch, La Grange, Ill., assignor to Corn Products Refining Company, New York, N. Y., a corporation of New Jersey No Drawing. Application January 7, 1939, Serial No. 249,822

6 Claims. (Cl. 134—12)

This invention relates to the treatment of zein for the production of zein films, impregnations, coatings, or other bodies; and one of the principal objects of the invention is to increase the water resistance, strength, and flexibility of zein films or other zein bodies of the types indicated. This object is effected, according to the present invention, by acetylating the zein, involving the production of a novel composition of matter, to wit, zein acetate, and the invention of certain processes for the acetylation of the zein which are also novel.

The invention also relates to the matter of dissolving zein acetate whereby the dry product may be put into a state suitable for use in the arts, that is, suitable for casting, spreading, molding, or impregnating, whereby the desired film, coating, impregnating stratum, or other zein body may be formed by evaporation of the solvent. In this aspect of the invention the object is to provide certain suitable solvents for zein acetate. Zein acetate is insoluble, it has been found, in ethyl alcohol, of any concentration; ethyl alcohol of 95% concentration, or at lower concentrations, being the commonest and most used solvent for zein.

With regard to the first part of the invention, the acetylation of the zein, the following acetylating agents have been found suitable: acetic anhydride, glacial acetic acid, acetyl chloride, and ketene. With each of these acetylating agents it is preferable to use a catalyst to increase the speed and extent of the reaction. Such catalysts are: sulfuric acid, anhydrous sodium acetate, phosphoric acid, phosphoric anhydride, tin chloride (SnCl$_4$), potassium acetate and acetic anhydride; the last named with acetylating agents other than acetic anhydride.

The degree of acetylation may be varied considerably. For example, zein acetates have been made (by the processes to be hereinafter described in detail) in which the acetyl varied from 2.8% to approximately 6.8% based upon the weight of the zein acetate. This would seem to mean that one or more than one acetyl group, $CH_3.CO$ may be hooked onto the zein molecules, dependent first, upon the size of the zein molecule and second, upon the extent to which the acetylating reaction has been carried.

The following examples will illustrate this aspect of the invention. It is understood, however, that these examples are to be considered as typical and illustrative, merely, and not as imposing limitations on the invention; the intention being to cover all equivalents and also all modifications within the scope of the appended claims.

EXAMPLE 1.—*The acetic anhydride method.*— 100 parts by weight of zein is mixed with 220 parts of acetic anhydride and 1 part of commercial concentrated sulphuric acid (about 95% concentration), and the mixture refluxed in a boiling water bath. The zein acetate formed by this reaction is precipitated by spraying or atomizing the material into cold water, after which the zein acetate may be filtered out and washed with water and dried, preferably by airdrying.

The amount of acetic anhydride used should be over 200% by weight of the zein. There should in any case be sufficient acetic anhydride to completely suspend the zein when heat is first applied. This is desirable in order to hasten the dissolving of the zein as the temperature rises. During refluxing the solution of zein and acetic anhydride is transformed into a solution of zein acetate in acetic anhydride.

The sulfuric acid, which is the catalyst, may vary in amount from 1% to 3% based upon the weight of the zein.

The refluxing time may vary from 1 to 3 hours.

In place of acetic anhydride one may use in this process, as acetylating agent, acetic acid or acetyl chloride.

So far as applicant's researches have gone, sulfuric acid appears to be the best catalyst because its use gives a zein acetate with the highest acetyl content, namely about 6.78%. The following table reports the results of different operations; the process being carried out in each case as described above except for the differences indicated in the table.

| Amount of zein | Amount of acetic anhydride | Kind and amount of catalyst by weight | Reflux time | Acetyl on weight of zein acetate |
|---|---|---|---|---|
|  |  |  | Hours | Percent |
| 100 | 220 | 5 anhydrous sodium acetate. | 1 | 5.39 |
| 100 | 200 | ---do--- | 1 | 5.81 |
| 108 | 216 | ---do--- | 3 | 5.81 |
| 100 | 200 | 1 of concentrated sulfuric acid. | 3 | 6.78 |
| 100 | 200 | ---do--- | 1 | 6.78 |
| 100 | 200 | 1 of phosphoric anhydride. | ½ | 4.41 |
| 100 | 200 | 2 phosphoric acid | ½ | 5.05 |
| 100 | 200 | 10 tin chloride | ½ | 5.48 |

EXAMPLE 2.—*The ketene method.*—Ketene $CH_2=C=O$ is a gas, so that it is desirable to suspend the zein in a liquid in order to treat it with this acetylating agent. The suspending liquid must be inert with respect to ketene and zein. A suitable method of procedure is as follows: 100 parts by weight of zein is suspended in 800 parts of toluene and there is added 4 parts of potassium acetate, as a catalyst. The ketene gas is then bubbled through the suspension for one hour. An excess of ketene should be used in practice. The reaction product, zein acetate, which is insoluble in the toluene, is then filtered, washed thoroughly with toluene, and dried. The product will contain about 5.27% of acetyl.

Instead of using potassium acetate as a catalyst, one may use acetic anhydride in like amount, which will give a zein acetate containing about 2.8% acetyl.

In place of using toluene as a suspending liquid acetone may be used. This, following in other respects the first-mentioned ketene formula, will give a zein acetate containing about 3.65% acetyl.

If no catalyst is used in the first mentioned ketene formula, a zein acetate will be obtained containing 3.65% acetyl.

Any suspending liquid inert with respect to ketene and zein may be used in place of toluene or acetone. The amount should be sufficient to completely suspend the zein. The minimum is probably about 200%, by weight on the zein.

The amount of catalyst may vary from 1% to 4% based upon the weight of the zein.

Assuming the Emil Fischer hypothesis as to the structure of the protein molecules, viz:

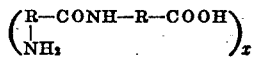

the acetylation reaction, where acetic anhydride is employed as acetylating agent, will be as follows:

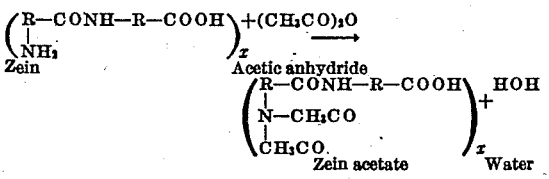

in which $x$ represents an unknown number of polymers of molecular units of zein.

Based upon like assumption as to the structure of the protein molecule, the reaction when ketene is the acetylating agent will be represented by the following:

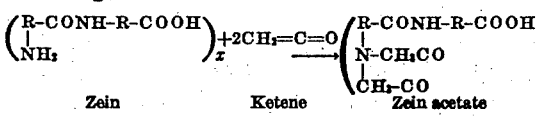

*Zein acetate solvents.*—Zein acetate is differentiated from zein in that it is not soluble in ethyl alcohol of any concentration. Zein acetate, however, has been discovered to be soluble in mixtures of ethyl alcohol and either butyl lactate or Cellosolve (ethylene glycol monoethyl ether). The following solvent mixtures have been found suitable:

(a) One-third butyl lactate and two-thirds 95% ethyl alcohol, by volume.

(b) One-third Cellosolve and two-thirds 95% ethyl alcohol.

The ethyl alcohol may, in each instance, vary between 50% and 80% and the other solvent between 50% and 20%.

Films prepared by dissolving zein acetate with the above mentioned solvents have been found to be stronger, more flexible, and to possess greater water resistance than films of zein alone or zein compounded with the usual so-called zein plasticizers.

I claim:

1. Zein actate in solution with 95% ethyl alcohol and one of the group of solvents consisting of butyl lactate and ethylene glycol monoethyl ether.

2. Zein acetate dissolved in a solvent consisting of 50% to 80% by weight of 95% ethyl alcohol and 50% to 20% of the substance from the group consisting of butyl lactate and ethylene glycol monoethyl ether.

3. Process for the production of zein acetate which comprises: mixing together zein and an acetylating agent of the group consisting of acetic anhydride, acetic acid, and acetyl chloride; heating and refluxing the mixture; and precipitating the zein acetate in water.

4. Process for the production of zein acetate which comprises: mixing together zein and an acetylating agent of the group consisting of acetic anhydride, acetic acid, and acetyl chloride; and a small amount of sulfuric acid as a catalyst; heating and refluxing the mixture; and precipitating the zein acetate in water.

5. Process for the production of zein acetate which comprises: mixing together zein and an acetylating agent of the group consisting of acetic anhydride, acetic acid and acetyl chloride in an amount more than 200% by weight of the zein; refluxing the mixture; and precipitating the zein acetate in water.

6. Process for the production of zein acetate which comprises: mixing together zein, an acetylating agent of the group consisting of acetic anhydride, actic acid, and acetyl chloride in an amount more than 200% by weight of the zein and, as a catalyst, 1% to 3%, based on the weight of the zein, of concentrated sulfuric acid; heating and refluxing the mixture; and precipitating the zein acetate in water.

COLLINS VEATCH.